United States Patent
Reitsma et al.

(10) Patent No.: US 10,341,107 B2
(45) Date of Patent: Jul. 2, 2019

(54) METHOD, SERVER, AND COMMUNICATION DEVICE FOR UPDATING IDENTITY-BASED CRYPTOGRAPHIC PRIVATE KEYS OF COMPROMISED COMMUNICATION DEVICES

(71) Applicant: MOTOROLA SOLUTIONS, INC., Schaumburg, IL (US)

(72) Inventors: Katrin Reitsma, Chicago, IL (US); Michael F. Korus, Eden Prairie, MN (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 76 days.

(21) Appl. No.: 15/174,424

(22) Filed: Jun. 6, 2016

(65) Prior Publication Data
US 2017/0353308 A1 Dec. 7, 2017

(51) Int. Cl.
*H04L 9/12* (2006.01)
*H04L 9/14* (2006.01)
(Continued)

(52) U.S. Cl.
CPC ............ *H04L 9/32* (2013.01); *H04L 9/0866* (2013.01); *H04L 9/0891* (2013.01); *H04L 9/14* (2013.01);
(Continued)

(58) Field of Classification Search
None
See application file for complete search history.

(56) References Cited

U.S. PATENT DOCUMENTS

| 6,782,103 B1 * | 8/2004 | Arthan | H04L 9/088 380/278 |
| RE43,934 E * | 1/2013 | Smith | H04K 1/02 380/286 |

(Continued)

FOREIGN PATENT DOCUMENTS

| EP | 1109351 A2 * | 6/2001 | ............. H04L 9/088 |
| JP | 2011523513 | 8/2011 | |

(Continued)

OTHER PUBLICATIONS

GB1708218.1 Combined Search and Examination Report dated Oct. 27, 2017 (7 pages).
(Continued)

*Primary Examiner* — Venkat Perungavoor
(74) *Attorney, Agent, or Firm* — Michael Best & Friedrich LLP

(57) ABSTRACT

Method, server, and communication device for updating identity-based cryptographic private keys of compromised communication devices. One method includes receiving, at a server, a security status indicating that the security of a first communication device has been compromised. The first communication device is associated with a user and includes a first identity-based cryptographic private key and a first user identifier. The method also includes, responsive to receiving the security status, determining, with the server, a second user identifier based on the first user identifier. The method further includes determining, with the server, a second identity-based cryptographic private key based on the second user identifier. The method also includes distributing, via the server, the second identity-based cryptographic private key to a second communication device. The second communication device is associated with the user.

13 Claims, 4 Drawing Sheets

(51) Int. Cl.
*H04L 9/32* (2006.01)
*H04L 29/06* (2006.01)
*H04W 4/10* (2009.01)
*H04L 9/08* (2006.01)
*H04W 12/04* (2009.01)
*G06F 21/62* (2013.01)

(52) U.S. Cl.
CPC .......... *H04L 63/062* (2013.01); *H04L 63/065* (2013.01); *H04L 63/08* (2013.01); *H04L 63/20* (2013.01); *H04W 4/10* (2013.01); *H04W 12/04* (2013.01)

(56) References Cited

U.S. PATENT DOCUMENTS

| | | | |
|---|---|---|---|
| 8,458,462 | B1 | 6/2013 | Hanna |
| 9,300,473 | B2* | 3/2016 | Nix ................... H04W 52/0235 |
| 2003/0126433 | A1* | 7/2003 | Hui ....................... H04L 9/3268 713/158 |
| 2004/0111636 | A1 | 6/2004 | Baffes et al. |
| 2006/0093150 | A1* | 5/2006 | Reddy .................. H04L 9/0825 380/282 |
| 2008/0162589 | A1* | 7/2008 | Rodeheffer ......... G06F 11/1469 |
| 2008/0232595 | A1* | 9/2008 | Pietrowicz ......... G06Q 20/3829 380/277 |
| 2010/0014677 | A1 | 1/2010 | Sato et al. |
| 2010/0153713 | A1* | 6/2010 | Klein .................... H04L 9/0891 713/158 |
| 2010/0329463 | A1 | 12/2010 | Ratliff et al. |
| 2013/0073860 | A1* | 3/2013 | Ibraimi .................. H04L 9/085 713/176 |
| 2013/0124870 | A1* | 5/2013 | Rosati .................. H04L 9/0847 713/176 |
| 2014/0095883 | A1* | 4/2014 | Kirillov ................ H04L 9/3281 713/176 |
| 2016/0034693 | A1* | 2/2016 | Takeuchi .............. G06F 21/602 713/189 |
| 2017/0353438 | A1 | 12/2017 | Reitsma et al. |
| 2017/0353455 | A1 | 12/2017 | Kruegel et al. |

FOREIGN PATENT DOCUMENTS

| | | | | |
|---|---|---|---|---|
| WO | WO-2004032416 A1 | * | 4/2004 | ............ H04L 9/321 |
| WO | WO-2008115988 A1 | * | 9/2008 | ........... H04L 9/3268 |
| WO | 2009/017984 | | 2/2009 | |
| WO | 2010033353 | | 3/2010 | |

OTHER PUBLICATIONS

GB1708181.9 Search Report dated Oct. 29, 2017 (5 pages).
3GPP TS 33.179, 3rd Generation Partnership Project; Technical Specification Group Services and System Aspects; Security of Mission Critical Push to Talk (MCPTT), technical specification, Feb. 2016, Release 13, pp. 1-77, V2.0.0.
PCT/US2017/032507 International Search Report and Written Opinion of the International Searching Authority dated Jul. 11, 2017 (17 pages).
Groves, "Elliptic Curve-Based Certificateless Signatures for Identity-Based Encryption (ECCSI)," memo RFC 6507, Feb. 2012, pp. 1-17, ISSN:2070-1721.
Groves, "Sakai-Kasahara Key Encryption (SAKKE)," memo RFC 6508, Feb. 2012, pp. 1-21, ISSN:2070-1721.
Groves, "Mikey-Sakke: Sakai-Kasahara Key Encryption in Multimedia Internet KEYing (MIKEY)," memo RFC 6509, Feb. 2012, pp. 1-21, ISSN:2070-1721.
3GPP TS 33.179, 3rd Generation Partnership Project; Technical Specification Group Services and System Aspects; Security of Mission Critical Push To Talk (MCPTT), technical specification, Mar. 2016, pp. 1-77, V1.1.0.
3GPP TS 33.303, "3rd Generation Partnership Project; Technical Specification Group Services and System Aspects; Proximity-based Services (ProSe); Security aspects," technical specification, Mar. 2016, pp. 1-88, V13.3.0.
3GPP TR 33.879, "3rd Generation Partnership Project;Technical Specification Group Services and System Aspects; Study on security enhancements for Mission Critical Push to Talk (MCPTT) over LTE," technical specification, Mar. 2016, pp. 1-86, V13.0.0.
Office Action from the US Patent and Trademark Office for U.S. Appl. No. 15/174,762 dated Mar. 9, 2018 (9 pages).
Office Action from the US Patent and Trademark Office for U.S. Appl. No. 15/174,816 dated Jul. 5, 2018 (14 pages).
Office Action from the US Patent and Trademark Office for U.S. Appl. No. 15/174,762 dated Jul. 23, 2018 (8 pages).

* cited by examiner

METHOD, SERVER, AND COMMUNICATION DEVICE FOR UPDATING IDENTITY-BASED CRYPTOGRAPHIC PRIVATE KEYS OF COMPROMISED COMMUNICATION DEVICES

BACKGROUND OF THE INVENTION

The 3$^{rd}$ Generation Partnership Project (3GPP) is standardizing Sakai-Kasahara Key Encryption in Multimedia Internet KEYing (MIKEY-SAKKE) for communication devices that communicate in accordance with the 33.179 Security of Mission Critical Push-To-Talk (MCPTT) specification. MIKEY-SAKKE and other key management schemes often rely on periodic key renewal to enhance security. However, many key management schemes do not include mechanisms for handling security compromised communication devices. As a result, push-to-talk groups with one or more security compromised communication devices cannot securely communicate because identity-based cryptographic private keys are not updated or revoked until the next scheduled key renewal period.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
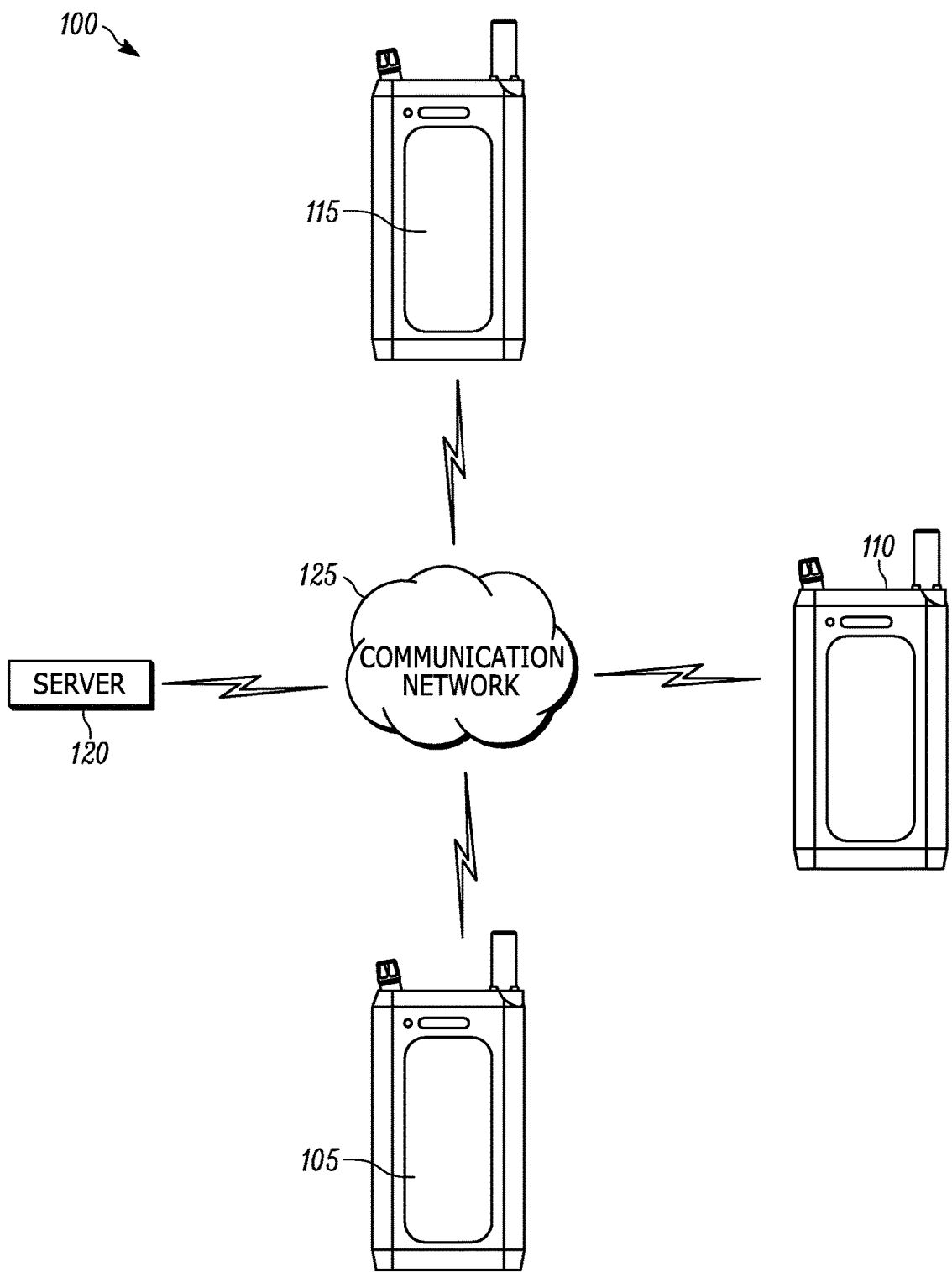
FIG. 1 is a diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of updating identity-based cryptographic private keys of compromised communication devices. In one example, the method includes receiving, at a server, a security status indicating that the security of a first communication device has been compromised. The first communication device is associated with a user and includes a first identity-based cryptographic private key and a first user identifier. The method also includes, responsive to receiving the security status, determining, with the server, a second user identifier based on the first user identifier. The method further includes determining, with the server, a second identity-based cryptographic private key based on the second user identifier. The method also includes distributing, via the server, the second identity-based cryptographic private key to a second communication device. The second communication device is associated with the user.

Another embodiment provides a server. In one example, the server includes a transceiver and an electronic processor. The electronic processor is electrically coupled to the transceiver. The electronic processor is configured to receive, via the transceiver, a security status indicating that the security of a first communication device has been compromised. The first communication device is associated with a user and includes a first identity-based cryptographic private key and a first user identifier. The electronic processor is also configured to determine a second user identifier based on the first user identifier responsive to receiving the security status. The electronic processor is further configured to determine a second identity-based cryptographic private key based on the second user identifier. The electronic processor is also configured to distribute, via the transceiver, the second identity-based cryptographic private key to a second communication device. The second communication device is associated with the user.

Another embodiment provides a communication device that is associated with a user. The communication device includes a memory, an electronic processor, and a transceiver. The memory includes an identity-based cryptographic private key. The electronic processor is electrically coupled to the memory. The electronic processor is configured to periodically perform security checks. The electronic processor is also configured to determine when the security of the communication device is compromised based on the security checks. The electronic processor is further configured to generate a security status indicating that the security of the communication device is compromised when the security of the communication device is compromised. The transceiver is electrically coupled to the electronic processor. The transceiver is configured to transmit the security status.

FIG. 1 is a diagram of a communication system 100 according to one embodiment. The communication system 100 includes a first communication device 105, a second communication device 110, a third communication device 115, and a server 120. The first communication device 105, the second communication device 110, the third communication device 115, and the server 120 communicate over a communication network 125. In some embodiments, the communication network 125 operates according to the Public Safety Long Term Evolution (LTE) communication protocol. In alternate embodiments, the communication network 125 operates using other wireless or wired communication protocols including, but not limited to, Terrestrial Trunked Radio (TETRA), Digital Mobile Radio (DMR), Project 25 (P25), 5G, Wi-Fi, Bluetooth®, cable, Ethernet, and satellite. The communication system 100 illustrated in FIG. 1 is provided as one example of such a system. The methods described herein may be used with communication systems with fewer, additional, or different components in different configurations than the communication system 100 illustrated in FIG. 1. For example, in some embodiments, the communication system 100 includes fewer or additional servers and may include fewer or additional communication devices.

The communication devices 105, 110, 115 may be devices capable of communicating over the communication network 125. As illustrated in FIG. 1, the communication devices 105, 110, 115 may be handheld or portable devices, such as smart telephones, portable radios, and tablet computers. In some embodiments, the communication devices 105, 110, 115 are portable, two-way radios carried by public safety personnel, such as police officers.

Each of the communication devices 105, 110, and 115 illustrated in FIG. 1 is associated with a user. Multiple communication devices may be associated with a single user. As an example, the first and second communication devices 105, 110 may both be associated with a first user and the third communication device 115 may be associated with a second user. A unique user identifier is associated with each user. The user identifier may include a uniform resource identifier (URI) (for example, username@domain). In some embodiments, the user identifier includes a session independent protocol (SIP) uniform resource identifier (for example, alice@example.org).

An identity-based cryptographic private key is also associated with each user. The identity-based cryptographic private key is determined based in part on the user identifier of each user. As used herein, the term "key," may refer to a single key, a plurality of keys, a single key pair, a plurality of key pairs, or any combination thereof. In some embodiments, multiple identity-based cryptographic key pairs are determined for each user identifier (for example, one identity-based cryptographic key pair for signing/verifying and one identity-based cryptographic key pair for encrypting/decrypting). The identity-based cryptographic private key is a part of an identity-based cryptographic key pair that also includes an identity-based cryptographic public key. The identity-based cryptographic public key is also determined based in part on the user identifier. As described below, the user identifiers, the identity-based cryptographic private keys, and the identity-based cryptographic public keys enable secure point-to-point communication and group communication between the communication devices of different users.

As an example, the first communication device 105 and the second communication device 110 may each include a first user identifier associated with a first user, a first identity-based cryptographic private key, and a first identity-based cryptographic public key. The third communication device 115 (of a second user) encrypts a communication destined for the first user using the first user's identity-based cryptographic public key or a pairwise session key that is derived using an identity-based key exchange protocol between the third communication device and one of the communication devices of the first user (for example, the first communication device 105 or the second communication device 110). The encrypted communication is transmitted by the third communication device 115 to the selected communication device of the first user (for example, the first communication device 105 or the second communication device 110) via, for example, the communication network 125. The selected communication device of the first user (for example, the first communication device 105 or the second communication device 110) decrypts the encrypted communication from the third communication device 115 using the first user's identity-based cryptographic private key or the pairwise session key.

The first and second users are members of a talk group (for example, a first talk group). As used herein, the term "talk group," may refer to a virtual radio channel (for example, a frequency channel) that is used for communication between a group of communication devices. A group key is associated with each talk group. Unlike an identity-based cryptographic key pair, which is unique to a single user, the group key is common across all members of a talk group. In some embodiments, a group key includes a symmetric group key. As described below, the group key enable secure communication between the members of the talk group.

As an example, the first communication device 105, the second communication device 110, and the third communication device 115 may each include a first group key. The third communication device 115 (of the second user) encrypts a message destined to a first group (including, for example, the first user) with the first group key. The encrypted communication is transmitted by the third communication device 115 to each communication device in the first talk group (for example, via the communication network 125). The first communication device 105 and the second communication device 110 decrypt the encrypted communication from the third communication device 115 using the first group key.

Figure 2:
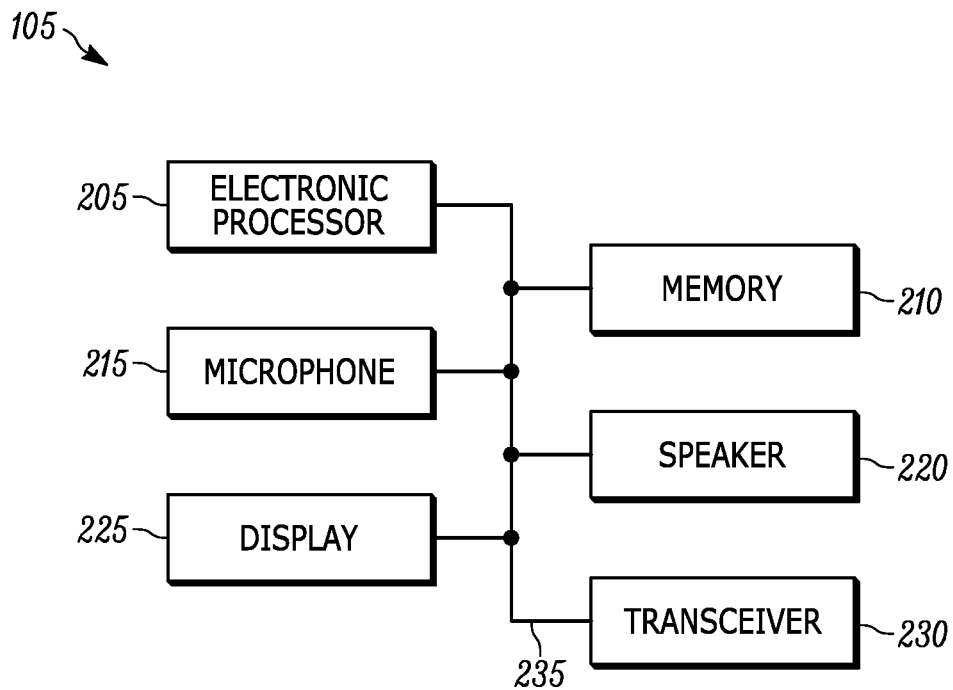
FIG. 2 is a diagram of a communication device included in the communication system of FIG. 1 in accordance with some embodiments.

FIG. 2 is a diagram of the first communication device 105 according to one embodiment. As illustrated in FIG. 2, the first communication device 105 may include an electronic processor 205, memory 210, a microphone 215, a speaker 220, a display 225, and a transceiver 230. The electronic processor 205, the memory 210, the microphone 215, the speaker 220, the display 225, and the transceiver 230 are connected to each other through one or more conductors or links such as a bus 235. In alternate embodiments, the first communication device 105 may include fewer or additional components in configurations different from the configuration illustrated in FIG. 2.

In some embodiments, the electronic processor 205 includes a primary electronic processor and a secondary electronic processor (for example, a separate secure electronic processor, a subscriber identification module (SIM) card electronic processor, a trusted platform module (TPM), and the like). The memory 210 stores instructions and data. The memory 210 may include combinations of different types of memory, such as read only memory (ROM), random access memory (RAM), and other memory. The electronic processor 205 retrieves instructions from the memory 210 and executes the instructions to perform a set of functions including the methods described herein.

The microphone 215 detects sound and outputs analogous electric signals representing the sound to the electronic processor 205. The speaker 220 receives electric signals from the electronic processor 205 and outputs sound.

The display 225 provides a visual output (for example, graphical indicators, lights, colors, text, images, combinations of the foregoing, and the like) regarding a status of the first communication device 105. The display 225 includes a suitable display mechanism for displaying the visual output (for example, a light-emitting diode (LED) screen, a liquid crystal display (LCD) screen, or the like).

The transceiver 230 transmits signals to the communication network 125 and receives signals from the communication network 125. Signals may include, for example, audio data, security statuses, and data packets. In some embodiments, the transceiver 230 includes a separate transmitter and receiver.

In some embodiments, the second and third communication devices 110, 115 may include components or combinations of different components, including all or some of the various components described above with respect to the first communication device 105.

Figure 3:
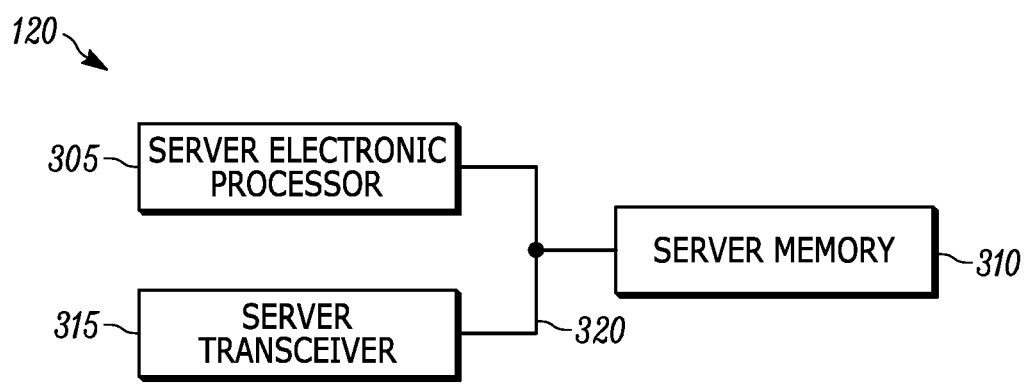
FIG. 3 is a diagram of a server included in the communication system of FIG. 1 in accordance with some embodiments.

FIG. 3 is a diagram of the server 120 according to one embodiment. In the example illustrated, the server 120 may include a server electronic processor 305, server memory 310, and a server transceiver 315. The server electronic processor 305, the server memory 310, and the server transceiver 315 communicate through one or more conductors or links 320. In other embodiments, the server 120 may include fewer or additional components in configurations different from that illustrated in FIG. 3. In some embodiments, the server 120 is a key management server. In alternate embodiments, the server 120 is a mobile device management server. In alternate embodiments, the server 120 is both a key management server and a mobile device management server.

The server memory 310 stores instructions and data. The server memory 310 may include combinations of different types of memory, including the various types of memory described above with respect to the memory 210. The server electronic processor 305 retrieves instructions from the server memory 310 and executes the instructions to perform a set of functions including the methods described herein. The server transceiver 315 transmits signals to and receives signals from the first communication device 105, such as through the communication network 125 or directly. Signals may include, for example, audio data, identity-based cryptographic private keys, group keys, security requests, and data packets.

There are many ways in which the security of a communication device may become compromised. In general, a communication device is compromised when it contains malware, has been rooted (for example, restrictions removed to allow access to low-level functions), the integrity of protected files or file partitions have been compromised or has detected key-tampering. A compromised communication device is obviously affected by a security breach. However, other communication devices may also be affected. As an example, a compromised communication device may compromise the security of other communication devices for the same user. In addition, a compromised communication device may compromise the security of other communication devices of other users which belong to the same talk groups as the user of the compromised communication device.

In some embodiments, for example, in mission critical push to talk applications, a user requires the same user identifier and identity-based cryptographic private key on all of their communication devices. As a result, the user of a compromised communication device cannot continue to securely communication with their associates. As an example, the first user cannot use the second communication device 110 to securely communicate with the third communication device 115 when the security of the first communication device 105 is compromised. To enable users of compromised communication devices to communication using their non-compromised communications devices, it is necessary to detect when a communication device is compromised.

The first communication device 105 determines when its security is compromised and reports it to the server 120. For example, in some embodiments, the first communication device 105, or more particularly, the electronic processor 205 executing instructions, may perform the method 400 illustrated in FIG. 4 to determine and report when the security of the first communication device 105 is compromised. The method 400 is described in terms of the communication system 100 illustrated in FIG. 1 to provide one example. The method 400 may be applied to other communication systems and is not limited to the communication system 100 illustrated in FIG. 1.

In the example illustrated, the method 400 includes the first communication device 105 performing a security check (at block 405). In some embodiments, the first communication device 105 determines when it had been rooted. As an example, the first communication device 105 determines that it has been rooted when a process runs at a privilege level higher than a defined level. In other embodiments, the first communication device 105 determines when a system image on the first communication device 105 has been altered. Generally, the system image on the first communication device 105 should be read-only. If the system image is not read-only (for example, writable), the security of the first communication device 105 may be compromised. In other embodiments, the first communication device 105 determines when a protected file or file partitions (for example, read-only) on the first communication device 105 has been altered. In other embodiments, the first communication device 105 determines when any of the keys from the first communication device 105 (for example, identity-based cryptographic private keys and group keys) have been extracted or tampered with.

After performing the security check, the first communication device 105 determines when the security of the first communication device 105 is compromised (at block 410). In some embodiments, the first communication device 105 determines that its security has been compromised when any of the above described conditions are detected during security checks. As an example, the first communication device 105 determines that its security is compromised when it is rooted, when malware is detected, or when key-tampering is detected.

Upon determining that its security is compromised, the first communication device 105 generates a security status (at block 415) using the electronic processor 205. The security status may include, for example, a user identifier, a device identifier, a device status, a time stamp, or any combination thereof. The device identifier identifies a specific communication device as opposed to a user of the communication device. As an example, the first and second communication devices 105, 110 may include the same user identifier but different device identifiers. The device status indicates when the security of the communication device is compromised. In some embodiments, the device status may include information about how the security of the first communication device 105 is compromised. The time stamp provides authentication of a genuine security status.

After generating the security status, the first communication device 105 transmits the security status to the server 120 (at block 420). In some embodiments, the first communication device 105 establishes a secure connection to the server 120 over which the security status is sent. For example, the first communication device 105 may establish a direct connection with the server 120 and transmit the security status over the direct connection, instead of over the communication network 125. In some embodiments, the secure tunnel terminates in a secure enclave in the electronic processor 205 (for example, in a Virtual Machine, a separate operating system image, a secure container, or separate secure element) on the first communication device 105.

Figure 4:
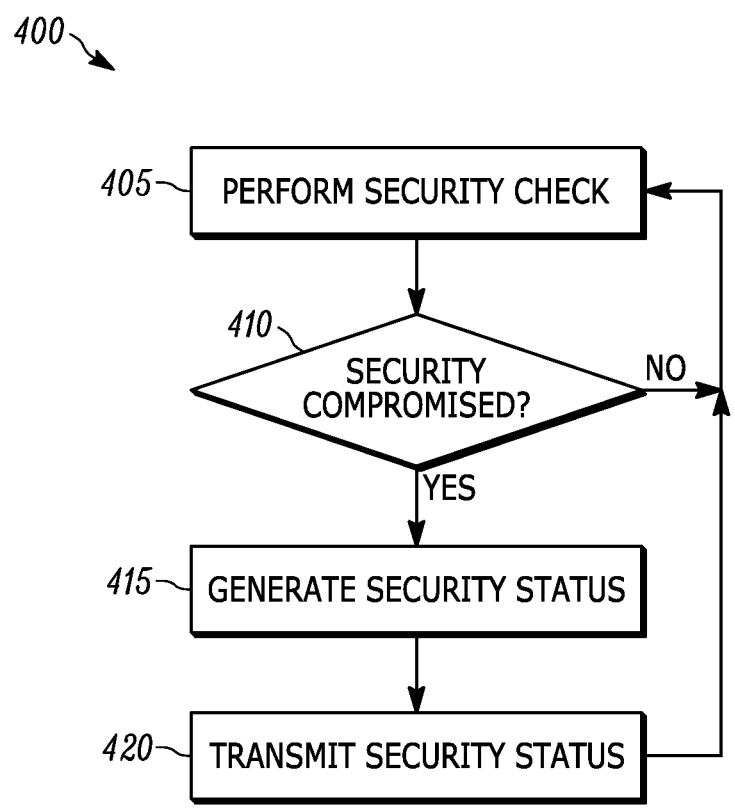
FIG. 4 is a flowchart of a method of determining and reporting when the security of a communication device is compromised in accordance with some embodiments.

In some embodiments, as illustrated in FIG. 4, the first communication device 105 performs another security check when its security is not compromised. In some embodiments, the first communication device 105 performs the security check periodically. As an example, the first communication device 105 may perform scheduled security checks once an hour, once a day, or once a week. In some embodiments, the first communication device 105 may perform an unscheduled security check in response to an event. As an example, the first communication device 105 may perform the security check in response to a security request which the first communication device 105 receives, for example, from the server 120. As a further example, the first communication device 105 may perform a security check after a new application is installed into the memory 210. In some embodiments, the first communication device 105 may generate and transmit the security status to the server 120 even when the security of the first communication device 105 is not compromised.

In some embodiments, the security status is cryptographically protected to provide authentication and integrity protection such that the security status cannot be altered on the first communication device 105 (for example, by malware) or en route while being sent to the server 120. For example, in some embodiments, the first communication device 105 digitally signs the security status. In such embodiments, the digital signature is transmitted to the server 120 with the security status.

The server 120 performs key management functions to ensure that identity-based cryptographic private keys and group keys are not distributed to compromised communication devices. Key management schemes without explicit key revocation (for example, using certificate revocation lists) may use periodic key renewal. With periodic key renewal, the server 120 performs scheduled updates of each of the identity-based cryptographic private keys and the group keys. As an example, in some embodiments, the scheduled updates occur once a month. In some embodiments, the scheduled updates of identity-based cryptographic private keys and group keys occur at the same time. In alternate embodiments, the scheduled updates of identity-based cryptographic private keys and group keys occur at different times. As an example, the server 120 may perform scheduled updates of identity-based cryptographic private keys on the first day of every month and perform scheduled updates of group keys on the fifth day of every month.

In some embodiments, each user identifier includes at least one additional component to facilitate scheduled updates. As an example, each user identifier may include a date suffix (for example, alice@example.org?P-Year=2016&P-Month=03). The date suffix may be changed during each scheduled update. As an example, a date suffix of P-Year=2016&P-Month=3 may be changed to P-Year=2016&P-Month=4 during a scheduled updated. As described above, each identity-based cryptographic private key is determined based on a user identifier. Thus, the server 120 determines a new identity-based cryptographic private key when a user identifier is updated.

In some embodiments, the server 120 may determine when the security of the first communication device 105 is compromised during a scheduled update. However, the first communication device 105 may become compromised a long time (for example, several days or a few weeks) before a scheduled update. As an example, the first communication device 105 may become compromised a few days after a monthly scheduled update. During this time, communications between communication devices of users that are members of any talk groups that the user of the first communication device 105 is a member of may be unsecure. Similarly, any point-to-point communications with a compromised device may be unsecure. Accordingly, in some embodiments, the first communication device 105 periodically determines when it is compromised to more efficiently address the issue.

As described above, both the first communication device 105 and the second communication device 110 are associated with the first user. Thus, the first user may use the second communication device 110 (or any other non-compromised communication device associated with the first user) when the security of the first communication device 105 is compromised. However, the non-compromised communication devices of the first user must by rekeyed in order to securely communicate with other non-compromised communication devices. At the same time, the non-compromised communication devices of other users in the same talk groups as the first user may need to be rekeyed to securely communicate in the talk group.

Upon determining that the security of the first communication device has been compromised, the server 120 may rekey the other non-compromised communication devices. For example, in some embodiments, the server 120, or more particularly, the server electronic processor 305 executing instructions, may perform the method 500 illustrated in FIG. 5 to update identity-based cryptographic private keys of compromised communication devices. The method 500 is described in terms of the communication system 100 illustrated in FIG. 1 to provide one example. The method 500 may be applied to other communication systems and is not limited to the communication system 100 illustrated in FIG. 1.

Figure 5:
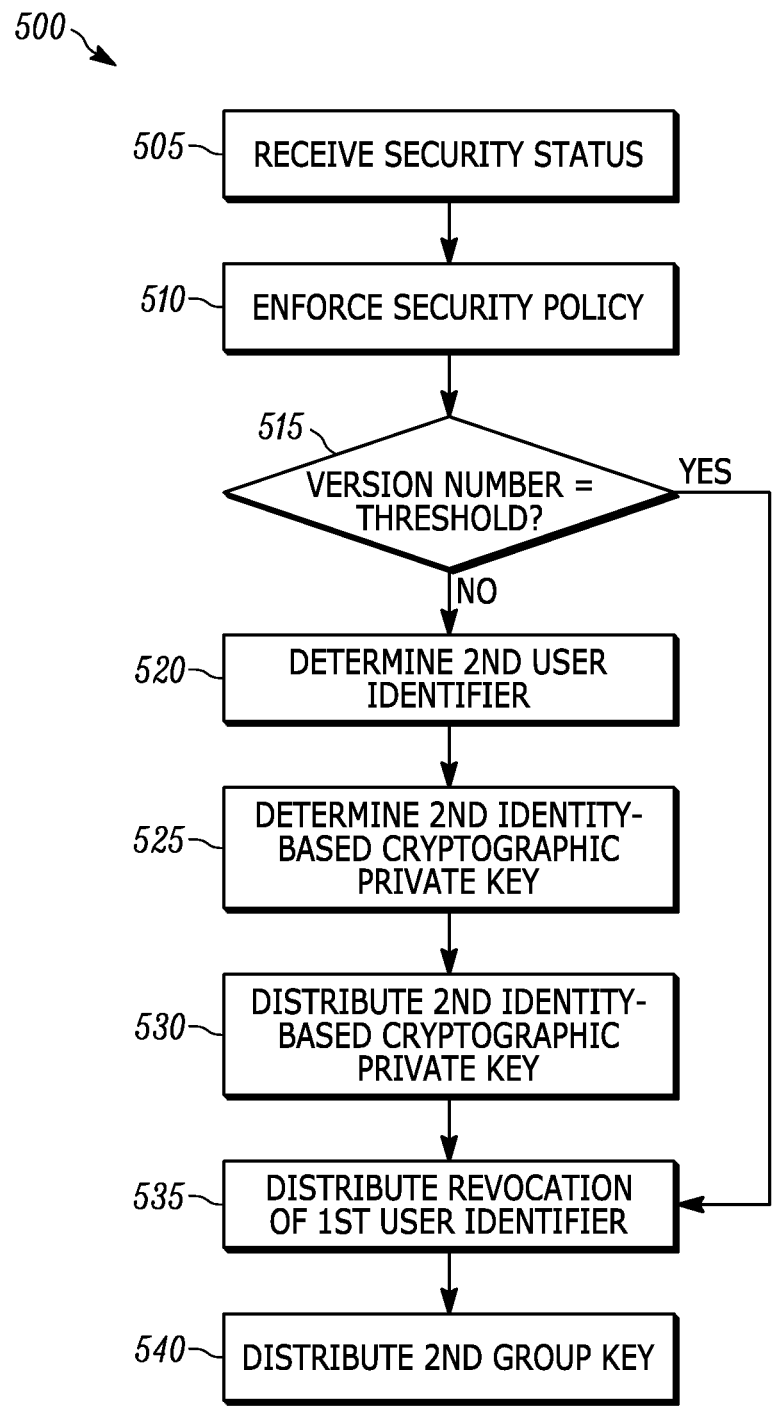
FIG. 5 is a flowchart of a method of updating identity-based cryptographic private keys in accordance with some embodiments.

As illustrated in FIG. 5, the method 500 includes the server 120 receiving a security status from the first communication device 105 indicating that the security of the first communication device 105 is compromised (at block 505). In some embodiments, the server 120 verifies the authenticity of the security status based on a digital signature included in the security status. Responsive to receiving the security status, the server 120 enforces a security policy on the first communication device 105 (at block 510). In some embodiments, the server 120 disables functionality of the first communication device 105 when the security of the first communication device 105 is compromised. In alternate embodiments, the server 120 erases (or zeroizes (for example, sets or resets all variables to zero)) the keys (for example, a first identity-based cryptographic private key and a first group key) stored in the first communication device 105. In yet another embodiment, the server 120 completely disables (or bricks) the first communication device 105.

In some embodiments, each user identifier includes at least one additional component to facilitate unscheduled updates. The server 120 may limit the number of rekeying for each user between scheduled updates. As an example, the server 120 may only rekey communication devices of a single user up to three times between scheduled updates. In some embodiments, the server 120 may use user identifiers to track the number of rekeyings for each user between scheduled updates. As explained above, user identifiers may include a session independent protocol uniform resource identifier and a date suffix (for example, alice@example.org?P-Year=2016&P-Month=03). User identifiers may also include additional components. As an example, in some embodiments, user identifiers include a version number (for example, alice@example.org?P-Year=2016&P-Month=03&P-version=00). The version number may be changed (for example, incremented or decremented) each time a user identifier is updated outside of a scheduled (for example, monthly) updates. In some embodiments, during a scheduled update, the date suffix may be changed and the version number may be reset to a default value (for example, zero).

Returning to FIG. 5, the server 120 determines when the version number of the current user identifier (for example, the first user identifier) for the compromised communication device (for example, the first communication device 105) is equal to a threshold (at block 515). As an example, the server 120 determines when the version number of the first user identifier for the first user is equal to the threshold. When the version number of the first user identifier is equal to the threshold, the server 120 may not rekey any communication devices of the first user until the next scheduled update. In some embodiments, as illustrated in FIG. 5 and as described in further detail below, the server 120 distributes a revocation of the first user identifier.

Alternately, when the version number of the first user identifier is not equal to the threshold, the server 120 determines a second user identifier of the first user based on the first user identifier (at block 520). As an example, the server 120 determines the second user identifier of the first user when the version number of the first user identifier is less than the three. In some embodiments, the server 120 determines the second user identifier by changing (for example, incrementing or decrementing) the version number of the first user identifier. As an example, the first user identifier may be alice@example.org?P-Year=2016&P-Month=03&P-version=00 and the second user identifier may be alice@example.org?P-Year=2016&P-Month=03&P-version=01.

After determining the second user identifier, the server 120 determines a second identity-based cryptographic private key based on the second user identifier (at block 525). As described above, identity-based cryptographic private keys are determined based on user identifiers. The server 120 also includes a secret (for example, a secret cryptographic key) that is only known to the server 120. The server 120 determines identity-based cryptographic private keys based on user identifier and the secret. Thus, the server 120 determines the second identity-based cryptographic private key based on the second user identifier and the secret.

After determining the second identity-based cryptographic private key, the server 120 distributes the second identity-based cryptographic private key to non-compromised communication devices of the first user (at block 530). As an example, the server 120 distributes the second identity-based cryptographic private key to the second communication device 110. The server 120 does not, however, distribute the second identity-based cryptographic private key to the first communication device 105 because its security is compromised.

Aside from rekeying non-compromised communication devices of the first user, non-compromised communication devices of other users that are in the same talk groups as the first user must be informed about the revocation of the first user identifier. Thus, in some embodiments, after distributing the second identity-based cryptographic private key to non-compromised communication devices of the first user, the server 120 distributes a revocation of the first user identifier to non-compromised communication devices of users that are in the same talk group as the first user (at block 535). Upon receiving the revocation of a user identifier, a communication device adds the revoked user identifier to a revocation list. As an example, the server 120 distributes a revocation of the first user identifier to the third communication device 115 because the first and second users are members of the same talk group. Upon receiving the revocation, the third communication device 115 adds the first user identifier of the first user to a revocation list. In some embodiments, the revocation of a user identifier may include a new (or updated) user identifier. As an example, a revocation of the first user identifier may include the second user identifier. In addition to adding the revoked user identifier to the revocation list, a communication device may replace the revoked user identifier with the second user identifier.

In some embodiments, the server 120 distributes the revocation to non-compromised communication devices of other users that may not be members of any of the same talk groups as the first user. As an example, the server 120 may distribute the revocation to all non-compromised communication devices of users that belong to a domain (for example, @example.org). As a further example, the server 120 may distribute the revocation to all non-compromised communication devices of users that may join at least one of the same talk groups as the first user.

As described above, communication between the three communication devices 105, 110, 115 are encrypted using a first group key. In some embodiments, server 120 may rekey the group keys of any communication devices with users that are in the same talk groups as the user of the compromised communication device. As such, the server 120 distributes a second group key to non-compromised communication devices of the first user and any users that are in the same talk groups as the first user (at block 540). As an example, the server 120 may distribute the second group key to the second and third communication devices 110, 115. The server 120 does not, however, distribute the second group key to the first communication device 105 because its security is compromised.

In some embodiments, the server 120 attempts to fix a compromised communication device. The server 120 may perform one or more corrective actions on a compromised communication device. Corrective actions may include, for example, resetting a compromised communication device or uninstalling an unwanted program on the compromised communication device (for example, malware).

A user may be unaware that one of their communication devices is compromised. Thus, in some embodiments, the server 120 transmits an alert signal indicating that the security of the communication device is compromised. The server 120 may transmit the alert signal to the compromised communication device, at least one non-compromised communication device of the same user, or both. In some embodiments, the server 120 distributes the alert signal after distributing the revocation of the first user identifier (at block 535). Upon receiving the alert signal, a communication device may generate a visual or audible alert. As an example, upon receiving an alert signal, the first communication device 105 may display a visual alert on the display 225 and produce an audible alert via the speaker 220. The visual and/or audible alert may indicate that the security of the communication device is compromised. In some embodiments, the alert may further indicate when another communication device of the user (for example, a non-compromised communication device) is available.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of updating identity-based cryptographic private keys of compromised communication devices, the method comprising:
   receiving, at a server, a security status indicating that security of a first communication device has been compromised, the first communication device associated with a user and including a first identity-based cryptographic private key and a first user identifier; and
   responsive to receiving the security status:
      determining, with the server, a second user identifier based on the first user identifier,
      determining, with the server, a second identity-based cryptographic private key based on the second user identifier, and
      distributing, via the server, the second identity-based cryptographic private key to a second communication device, the second communication device associated with the user,
   wherein the first user identifier includes an identifier of the user, a date, and a first version number, wherein the second user identifier includes the identifier of the user, the date, and a second version number, and wherein the identifier of the user includes at least one selected from a group consisting of a uniform resource identifier and a session independent protocol uniform resource identifier.

2. The method of claim 1, wherein the user is a first user, wherein the method further comprising:
   distributing, via the server, a revocation of the first user identifier to a third communication device, the third communication device associated with a second user.

3. The method of claim 2, wherein the first communication device, the second communication device, and the third communication device each including a first group key, wherein the method further comprising:
   distributing, via the server, a second group key to the second communication device and the third communication device when the security of the first communication device has been compromised.

4. The method of claim 1, wherein the security status is a first security status, wherein the method further comprising:

receiving, at the server, a second security status indicating that the security of the first communication device has been compromised, and responsive to receiving the second security status and when the second version number is not equal to a threshold:

determining, with the server, a third user identifier based on the second user identifier, determining, with the server, a third identity-based cryptographic private key based on the third user identifier, and distributing, via the server, the third identity-based cryptographic private key to the second communication device.

5. The method of claim 1, wherein the security status is cryptographically protected to provide at least one selected from a group consisting of authentication and integrity protection.

6. The method of claim 1, further comprising performing, with the server, a corrective action on the first communication device when the security of the first communication device has been compromised.

7. The method of claim 1, further comprising disabling, with the server, functionality of the first communication device when the security of the first communication device has been compromised.

8. The method of claim 1, further comprising erasing, with the server, the first identity-based cryptographic private key on the first communication device when the security of the first communication device has been compromised.

9. The method of claim 1, further comprising:

determining, with the first communication device, when the security of the first communication device is compromised; and transmitting, from the first communication device, the security status indicating that the security of the first communication device is compromised.

10. A server comprising:

a transceiver; and an electronic processor electrically coupled to the transceiver and configured to:

receive, via the transceiver, a security status indicating that security of a first communication device has been compromised, the first communication device associated with a user and including a first identity-based cryptographic private key and a first user identifier, and responsive to receiving the security status:

determine a second user identifier based on the first user identifier, determine a second identity-based cryptographic private key based on the second user identifier, and distribute, via the transceiver, the second identity-based cryptographic private key to a second communication device, the second communication device associated with the user, wherein the first user identifier includes an identifier of the user, a date, and a first version number, wherein the second user identifier includes the identifier of the user, the date, and a second version number, and wherein the identifier of the user includes at least one selected from a group consisting of a uniform resource identifier and a session independent protocol uniform resource identifier.

11. The server of claim 10, wherein the user is a first user, wherein the electronic processor is further configured to:

distribute, via the transceiver, a revocation of the first user identifier to a third communication device, the third communication device associated with a second.

12. The server of claim 11, wherein the first communication device, the second communication device, and the third communication device each includes a first group key, wherein the electronic processor is further configured to:

distribute, via the transceiver, a second group key to the second communication device and the third communication device when the security of the first communication device has been compromised.

13. The server of claim 10, wherein the security status is a first security status, wherein the electronic processor is further configured to:

receive, via the transceiver, a second security status indicating that the security of the first communication device has been compromised, and responsive to receiving the second security status and when the second version number is not equal to a threshold:

determine a third user identifier based on the second user identifier, determine a third identity-based cryptographic private key based on the third user identifier, and distribute, via the transceiver, the third identity-based cryptographic private key to the second communication device.

* * * * *